(12) United States Patent
Sandhu

(10) Patent No.: US 8,406,114 B2
(45) Date of Patent: Mar. 26, 2013

(54) BASE STATION AND METHOD FOR TRANSMITTING DOWNLINK REFERENCE SIGNALS FOR MIMO CHANNEL ESTIMATION

(75) Inventor: Sumeet Sandhu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 13/083,822

(22) Filed: Apr. 11, 2011

(65) Prior Publication Data

US 2011/0188592 A1  Aug. 4, 2011

Related U.S. Application Data

(63) Continuation of application No. 12/245,466, filed on Oct. 3, 2008, now Pat. No. 7,940,638, which is a continuation of application No. 10/751,007, filed on Dec. 30, 2003, now Pat. No. 7,450,489.

(51) Int. Cl.
*H04J 9/00* (2006.01)

(52) U.S. Cl. ........................................ 370/204; 370/208

(58) Field of Classification Search .................. 370/204, 370/208, 482, 491
See application file for complete search history.

(56) References Cited

U.S. PATENT DOCUMENTS

| | | | |
|---|---|---|---|
| 6,185,258 B1 | 2/2001 | Alamouti et al. | |
| 6,452,981 B1 | 9/2002 | Raleigh et al. | |
| 7,221,645 B2 | 5/2007 | Wang et al. | |
| 7,450,489 B2 | 11/2008 | Sandhu | |
| 2002/0041635 A1 | 4/2002 | Ma et al. | |
| 2002/0110138 A1 | 8/2002 | Schramm | |
| 2002/0122381 A1 | 9/2002 | Wu et al. | |
| 2002/0145971 A1 | 10/2002 | Cho et al. | |
| 2002/0193146 A1 | 12/2002 | Wallace et al. | |
| 2003/0072255 A1* | 4/2003 | Ma et al. | 370/208 |
| 2003/0072382 A1 | 4/2003 | Raleigh et al. | |
| 2003/0125040 A1 | 7/2003 | Walton et al. | |
| 2004/0004935 A1 | 1/2004 | Zhu et al. | |
| 2004/0013211 A1 | 1/2004 | Lindskog et al. | |
| 2004/0086027 A1* | 5/2004 | Shattil | 370/208 |
| 2004/0131011 A1* | 7/2004 | Sandell et al. | 370/208 |
| 2004/0233838 A1 | 11/2004 | Sudo et al. | |
| 2005/0002326 A1 | 1/2005 | Ling et al. | |
| 2005/0141407 A1 | 6/2005 | Sandhu | |
| 2005/0195733 A1 | 9/2005 | Walton et al. | |
| 2005/0195734 A1 | 9/2005 | Sandell et al. | |
| 2005/0259567 A1 | 11/2005 | Webster et al. | |
| 2006/0034163 A1 | 2/2006 | Gore et al. | |
| 2006/0227891 A1 | 10/2006 | Niu et al. | |
| 2007/0291639 A1 | 12/2007 | Jacobsen et al. | |
| 2008/0002568 A1 | 1/2008 | Wu et al. | |
| 2009/0034644 A1 | 2/2009 | Sandhu | |

FOREIGN PATENT DOCUMENTS

| | | |
|---|---|---|
| CN | 1331528 | 1/2002 |
| EP | 1170897 A1 | 9/2002 |
| EP | 1494381 A1 | 1/2005 |
| JP | 2001036442 | 2/2001 |

(Continued)

OTHER PUBLICATIONS

"U.S. Appl. No. 10/751,007, Preliminary Amendment filed Apr. 10, 2008", 13 pgs.

(Continued)

*Primary Examiner* — Ricky Ngo
*Assistant Examiner* — Phuongchau B Nguyen
(74) *Attorney, Agent, or Firm* — Schwegman, Lundberg & Woessner, P.A.

(57) ABSTRACT

In a wireless network, a base station is configured to transmit downlink reference signals to allow a mobile device to derive a MIMO channel estimate.

18 Claims, 4 Drawing Sheets

FOREIGN PATENT DOCUMENTS

| | | |
|---|---|---|
| JP | 2001345777 | 12/2001 |
| JP | 2002044051 | 2/2002 |
| JP | 2002118534 | 4/2002 |
| JP | 2002271340 | 9/2002 |
| WO | WO-03034644 A1 | 4/2003 |
| WO | WO-03085869 A1 | 10/2003 |
| WO | WO-2005067247 A1 | 7/2005 |

OTHER PUBLICATIONS

"U.S. Appl. No. 10/751,007, Notice of Allowance mailed Jun. 30, 2008", 18pgs.

"U.S. Appl. No. 12/245,466, Final Office Action mailed Jul. 20, 2010", 10 pgs.

"U.S. Appl. No. 12/245,466, Advisory Action mailed Oct. 1, 2010", 3 pgs.

"U.S. Appl. No. 12/245,466, Non Final Office Action Mailed Aug. 3, 2009", 16 pgs.

"U.S. Appl. No. 12/245,466, Non-Final Office Action mailed Feb. 3, 2010", 9 pgs.

"U.S. Appl. No. 12/245,466, Notice of Allowance mailed Dec. 29, 2010", 8 pgs.

"U.S. Appl. No. 12/245,466, Response filed Apr. 21, 2010 to Non Final Office Action mailed Feb. 3, 2010", 6 pgs.

"U.S. Appl. No. 12/245,466, Response filed Nov. 3, 2009 to Non Final Office Action mailed Aug. 3, 2009", 7 pgs.

"U.S. Appl. No. 12/245,466, Response filed Sep. 20, 2010 to Final Office Action mailed Jul. 20, 2010", 6 pgs.

"Chinese Application Serial No. 200480039528, Office Action mailed Jun. 12, 2009", 4 pgs.

"International Search Report for corresponding PCT Application No. PCT/US2004/043324", (May 19, 2005), 4 pgs.

"Japanese Application Serial No. P2006-547369, Office Action mailed Mar. 11, 2009", 15 pgs.

"Japanese Application Serial No. P2006-547369, Final Office Action Mailed Jan. 18, 2010", 6 Pages.

"Oral Hearing—European Application No. 0481540.3", (Feb. 13, 2008), 12 pgs.

Boer, Jan, et al., "Backward Compatibility", IEEE 802.11-03714RO, (Sep. 2003).

Suto, Kenji, et al., "Performance Evaluation of Space Time Frequency Block Code over Frequency Selective Fading Channels", IEEE Technical Report of IECICE, vol. 102, (Aug. 2002), 59-64.

\* cited by examiner

BASE STATION AND METHOD FOR TRANSMITTING DOWNLINK REFERENCE SIGNALS FOR MIMO CHANNEL ESTIMATION

RELATED APPLICATIONS

This application is a continuation of U.S. patent application Ser. No. 12/245,466, filed Oct. 3, 2008, now U.S. Pat. No. 7,940,638 which is a continuation of U.S. patent application Ser. No. 10/751,007, filed Dec. 30, 2003, now issued as U.S. Pat. No. 7,450,489, both of which are incorporated herein by reference in their entireties.

TECHNICAL FIELD

Embodiments of the invention pertain to wireless electronic communications and, in some embodiments, to wireless networks that use orthogonal frequency division multiplexed (OFDM) signals.

BACKGROUND

The throughput of many conventional orthogonal frequency division multiplexed (OFDM) systems has been limited by the communication capacity of the individual channels. To achieve higher throughput, multiple antennas may be used to communicate additional data without an increase in frequency bandwidth. One problem with employing multiple antenna devices is that at least some of their communications should be compatible with legacy communication devices that use single antennas.

BRIEF DESCRIPTION OF THE DRAWINGS

The appended claims are directed to some of the various embodiments of the invention. However, the detailed description presents a more complete understanding of embodiments of the invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
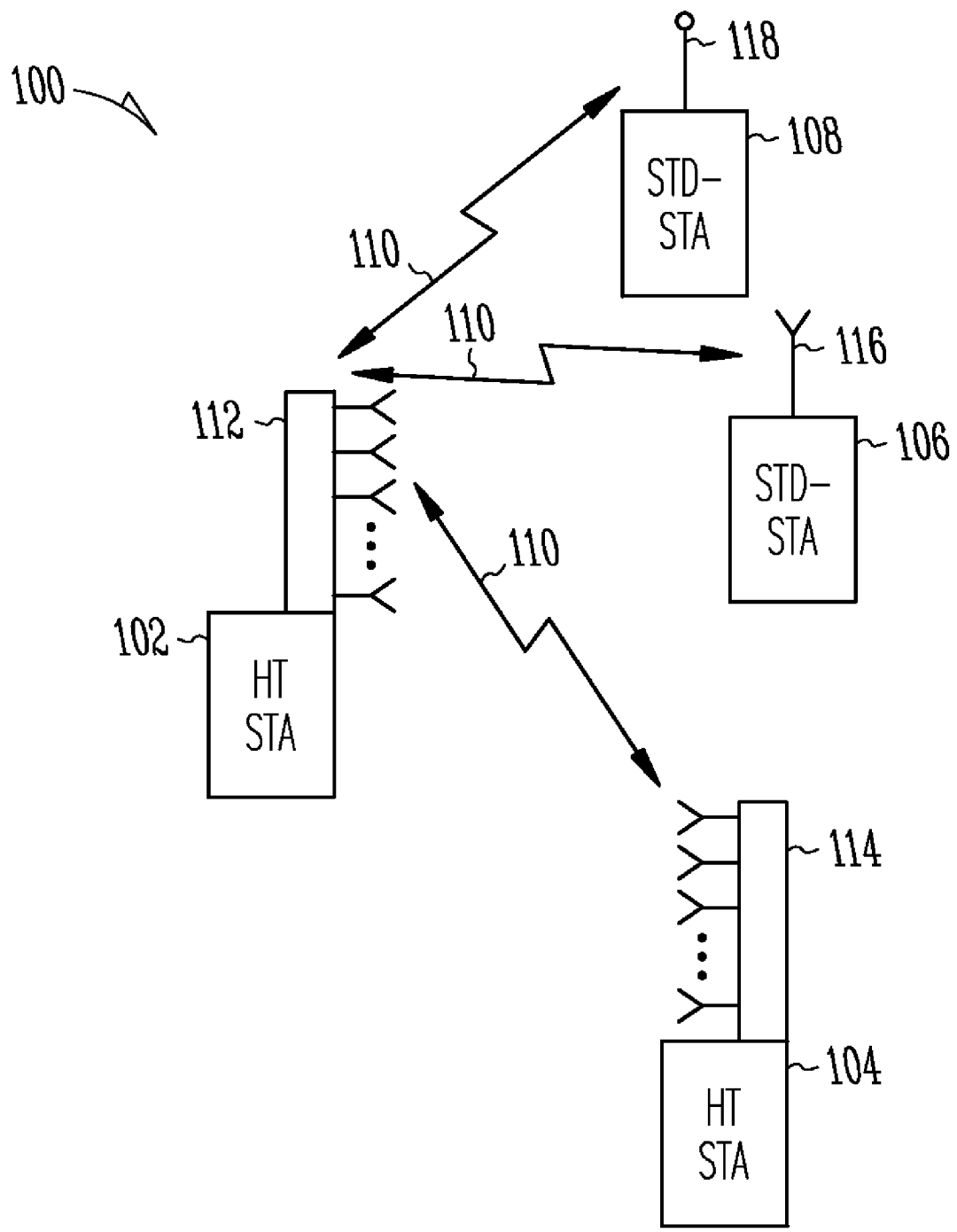
FIG. 1 illustrates an operational environment in accordance with some embodiments of the invention.

FIG. 1 illustrates an operational environment in accordance with some embodiments of the invention. Operational environment 100 includes one or more communication stations (STA) 104, 106 and 108, which may communicate with access point (AP) 102 over links 110. In some embodiments, access point 102 and communication stations 104, 106 and/or 108 may communicate orthogonal frequency-division multiplexed (OFDM) communication signals. In some embodiments, access point 102 and communication stations 106 and 108 may communicate OFDM packets on a single frequency channel using single transmit and receive antennas. In some embodiments, access point 102 and communication station 104 may communicate OFDM packets on a combination of single or multiple frequency channels using single or multiple transmit and receive antennas. In some of these embodiments, access point 102 may be referred to as a high-throughput access point, communication station 104 may be referred to as a high-throughput communication station, and communication stations 106 and 108 may be referred to as legacy or standard-throughput communication stations, although the scope of the invention is not limited in this respect. In accordance with some embodiments, a high-throughput communication channel may comprise a plurality of spatial channels transmitted over a single frequency channel. In some embodiments, different frequency channels transmitted on spatially diverse antennas may be used to define the spatial channels.

In some embodiments, high-throughput access point 102 and high-throughput communication station 104 may utilize more than one of spatially-diverse antennas to "divide" the channel into one or more spatial channels. In some embodiments, each transmit antenna may define one spatial channel. In other embodiments, beamforming and/or spatial multiplexing may be used to "divide" the channel into spatial channels. In these embodiments, each spatial channel may be used to communicate separate or independent data streams on the same subcarriers as the other spatial channels, allowing the communication of additional data without an increase in frequency bandwidth. The use of spatial channels may take advantage of the multipath characteristics of the channel. In some embodiments, the spatial channels may be non-orthogonal channels, although the scope of the invention is not limited in this respect.

OFDM channels may comprise a plurality of orthogonal subcarriers. In some embodiments, the orthogonal subcarriers of a channel may be closely spaced OFDM subcarriers. To achieve orthogonality between closely spaced subcarriers, in some embodiments the subcarriers of a particular channel may have a null at substantially a center frequency of the other subcarriers of that channel. In some embodiments, the channels may have a bandwidth of substantially 20-MHz, although channels having narrower or wider bandwidths are equally suitable for use with embodiments of the invention.

Communication stations 104, 106 and/or 108 may perform training for each OFDM packet based on receipt of a training sequence as part of a packet preamble. In accordance with some embodiments, high-throughput access point 102 may transmit training tones over a plurality of spatial channels during a first portion of an OFDM packet preamble. The training tones may be interspersed among subcarrier frequencies of the spatial channels. In these embodiments, high-throughput access point 102 may retransmit the training tones during a second portion of the packet preamble. The training tones may be shifted among the subcarrier frequencies of the spatial channels for retransmission during the second portion of the packet preamble. In some embodiments, high-throughput access point 102 may include a plurality of spatially diverse antennas 112, and each antenna may be associated with a spatial channel, although the scope of the invention is not limited in this respect. This is discussed in more detail below.

In some embodiments, high-throughput communication station 104 may receive at least the first and second portions of the packet preamble and may perform a channel estimation for each of the spatial channels based on the known training sequence. In some embodiments, high-throughput communication station 104 includes a plurality of receive antennas 114, and each receive antenna may correspond to one of the spatial channels. High-throughput communication station 104 may combine data bits from each spatial channel received in a subsequent data unit portion of an OFDM packet to generate a demodulated OFDM symbol.

In other embodiments, high-throughput communication station 104 may use a single receive antenna to processes the signals from the spatial channels. In these embodiments, high-throughput communication station 104 may perform signal processing to separate data symbols transmitted on each spatial channel and to combine data bits from each spatial channel to generate a demodulated OFDM symbol.

In accordance with embodiments of the invention, standard-throughput communication stations 106 and/or 108 may have single antennas 116 and 118 respectively. Standard-throughput communication stations 106 and/or 108 may receive the first and second portions of the packet preamble transmitted by high-throughput access point 102 and may set their network allocation vectors (NAVs) in response to processing the received training tones. Standard-throughput communication stations 106 and/or 108 may also refrain from transmitting during a subsequent predetermined time frame by virtue of their set NAVs. In some embodiments, standard-throughput communication stations 106 and/or 108 may set a physical layer NAV (i.e., without processing the remainder of the packet), while in other embodiments, standard-throughput communication stations 106 and/or 108 may set a media-access control (MAC) layer NAV after processing additional portions of the packet.

Antennas 112 and 114 may comprise a plurality of individual antennas, and in some embodiments, they may comprise a plurality of spatially-diverse antennas separated by a distance to take advantage of the different multipath characteristics of a channel to define corresponding spatial channels. In other embodiments, antennas 112 and 114 may comprise a multi-element antenna with independent elements that may take advantage of the different multipath characteristics of a channel to define corresponding spatial channels. Antennas 112 and 114 may comprise directional or omnidirectional antennas, including, for example, dipole antennas, monopole antennas, loop antennas, microstrip antennas or other types of antennas suitable for reception and/or transmission of radio-frequency (RF) signals. Antennas 116 and 118, on the other hand, may comprise a single antenna or antennas that do not necessarily take advantage of the multipath characteristics of a channel to define spatial channels.

Communication stations 104, 106 and/or 108 may include, for example, personal digital assistants (PDAs), laptop and portable commuters with wireless communication capability, web tablets, wireless telephones, wireless headsets, pagers, instant messaging devices, digital cameras, and other devices that may receive and/or transmit information wirelessly. Communication stations 104, 106 and/or 108 may communicate with access point 102 using a multi-carrier transmission technique, such as an orthogonal frequency division multiplexing technique that uses orthogonal subcarriers to transmit information within an assigned spectrum, although the scope of the invention is not limited in this respect.

In addition to facilitating communications between communication stations 104, 106 and/or 108, access point 102 may be coupled with one or more networks, such as an intranet or the Internet, allowing communication stations 104, 106 and/or 108 to access such networks. Although environment 100 illustrates point-to-point communications, embodiments of the invention are suitable for point-to-multipoint communications. In these embodiments, communication stations 104, 106 and/or 108 may communicate directly (i.e., without the use of access point 102). As used herein, the term communication station may apply equally to access point 102 as well as communication stations 104, 106 and 108.

In some embodiments, the frequency spectrums for an OFDM channel may include either a 5 GHz frequency spectrum or a 2.4 GHz frequency spectrum, although the scope of the invention is not limited in this respect. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums may be equally suitable.

In some embodiments, access point 102 and communication stations 104, 106 and/or 108 may communicate substantially in accordance with specific communication standards, such as the Institute of Electrical and Electronics Engineers (IEEE) standards including the IEEE 802.11(a/h), 802.11(b), 802.11(g) 802.11(n) and/or 802.16 standards for wireless local area networks, although access point 102 and communication stations 104, 106 and/or 108 may also be suitable to transmit and/or receive communications in accordance with other techniques including the Digital Video Broadcasting Terrestrial (DVB-T) broadcasting standard, and the High performance radio Local Area Network (HiperLAN) standard. In some embodiments, high-throughput access point 102 and high-throughput communication station 104 may operate in accordance with the IEEE 802.11(n) communication standards.

In accordance with some embodiments, access point 102 and communication stations 104, 106 and/or 108 may symbol-modulate the subcarriers in accordance with individual subcarrier modulation assignments. This may be referred to as adaptive bit loading (ABL). Accordingly, one or more bits may be represented by a symbol modulated on a subcarrier. The modulation assignments for the individual subcarriers may be based on the channel characteristics or channel conditions for that subcarrier, although the scope of the invention is not limited in this respect. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation orders with higher data communication rates per subcarrier may also be used.

Figure 2:
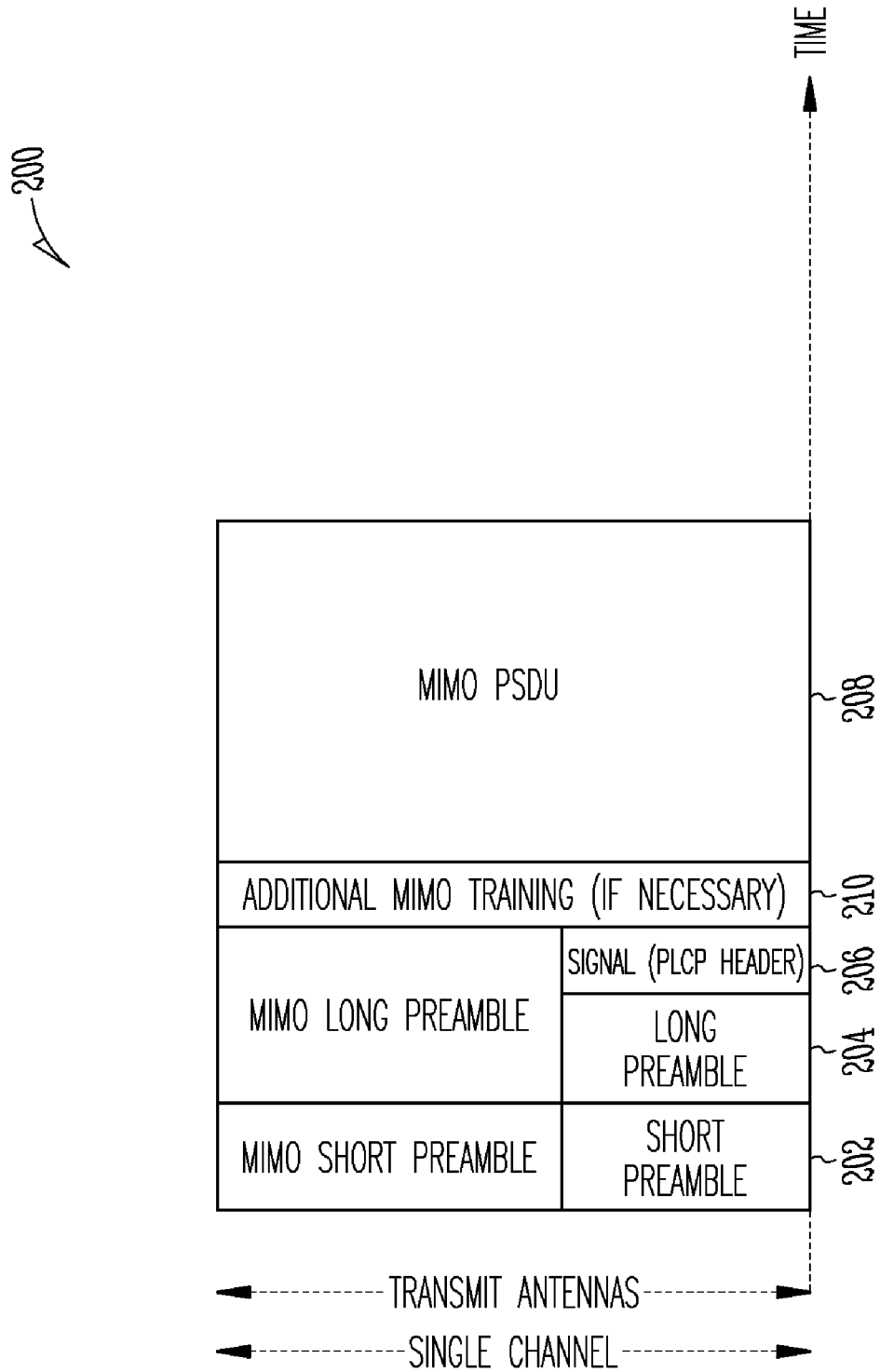
FIG. 2 illustrates an OFDM packet in accordance with some embodiments of the invention.

FIG. 2 illustrates an OFDM packet in accordance with some embodiments of the invention. OFDM packet 200 comprises short preamble 202, long preamble 204, signal header 206, and data unit portion 208. In some embodiments, packet 200 may be transmitted by a high-throughput communication station, such as high-throughput access point 102 (FIG. 1), and/or high-throughput communication station 104 (FIG. 1). In these embodiments, packet 200 may be transmitted on a plurality of spatial channels. In some embodiments, packet 200 may be referred to as a physical protocol data unit (PPDU), although the scope of the invention is not limited in this respect.

Short preamble 202 may be received by a high-throughput communication station for performing frequency offset estimations, gain control, and/or frame detection. In some embodiments, short preamble 202 may be referred to as a multiple-input, multiple-output (MIMO) short preamble, although the scope of the invention is not limited in this respect. Long preamble 204 may be received by a high-throughput communication station for performing a more precise frequency estimation including channel estimation. In some embodiments, long preamble 204 may be referred to as a MIMO long preamble, although the scope of the invention is not limited in this respect.

Signal header 206, also part of the preamble, may include information about the frequency and/or channelization structure of data unit portion 208, including, for example, subcarrier modulation assignments and other information for demodulating data unit portion 208. In some embodiments, additional training field 210 may be included.

In some embodiments, data unit portion 208 may be referred to as a physical service data unit (PSDU), although the scope of the invention is not limited in this respect. Data unit portion 208, which may carry the data of packet 200, is not required in every packet.

In accordance with embodiments of the invention, preamble 204 may comprise a long training sequence of known values. The known training sequence may comprise two long training symbols. In accordance with some embodiments of the invention, long preamble 204 may be readable by both standard-throughput communication stations and high-throughput communication stations.

Data unit portion 208 comprises data symbols transmitted on data subcarriers of the channel. In some embodiments, data unit portion 208 may be configured differently depending on the operational mode of the communication stations. For example, for high-throughput operation, the data unit portion comprises data symbols transmitted on the subcarriers of each spatial channel to achieve a higher throughput. In this case, each spatial channel may separate data streams transmitted thereon. For lower packet error rate operations, data unit portion 208 may comprise the identical data symbols transmitted on corresponding subcarriers of each spatial channel. In this case, each spatial channel may have substantially identical data streams transmitted thereon. For medium throughput and medium packet error rate operations, data unit portion 208 may comprise the identical data symbols transmitted on corresponding subcarriers of some of the spatial channels and may comprises different data symbols transmitted on some other spatial channels. In this case, when four spatial channels are utilized, one data stream may be transmitted over two spatial channels, and another data stream may be transmitted over the other two spatial channels, although the scope of the invention is not limited in this respect.

In some embodiments, for lower packet error rate operations, the data unit portion comprises linear combinations of spatial streams transmitted on corresponding subcarriers of each spatial channel. In some embodiments, for medium throughput and medium packet error rate operations, the data unit portion may comprise linear combinations of spatial streams transmitted on corresponding subcarriers of at least some of the spatial channels and comprises different data symbols transmitted on at least some others of the spatial channels.

In some embodiments, a high-throughput access point and a high-throughput communication station may perform an association. The association process may, among other things, inform the transmitting station that the receiving station has a plurality of antennas to receive orthogonal frequency division multiplexed signals over a corresponding plurality of spatial channels.

Figure 3A:
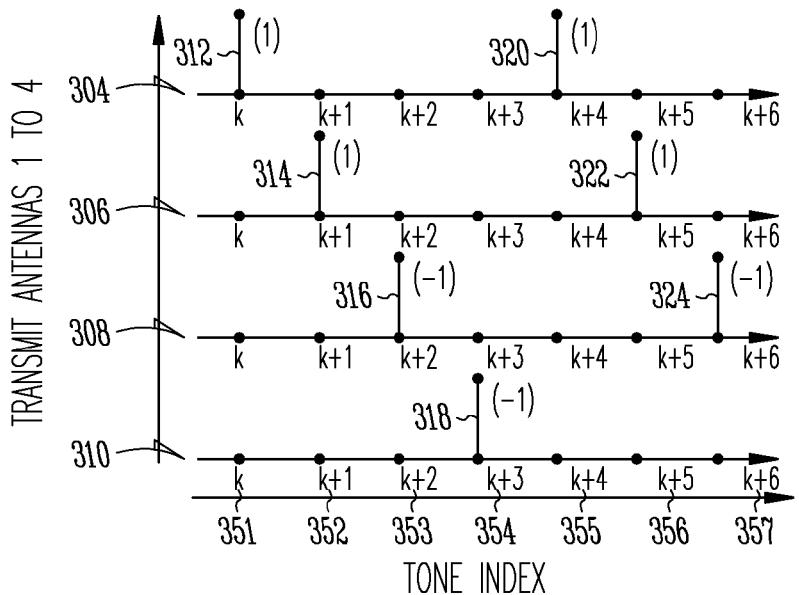
FIGS. 3A and 3B illustrate transmission of a training sequence in accordance with some embodiments of the invention.
Figure 3B:
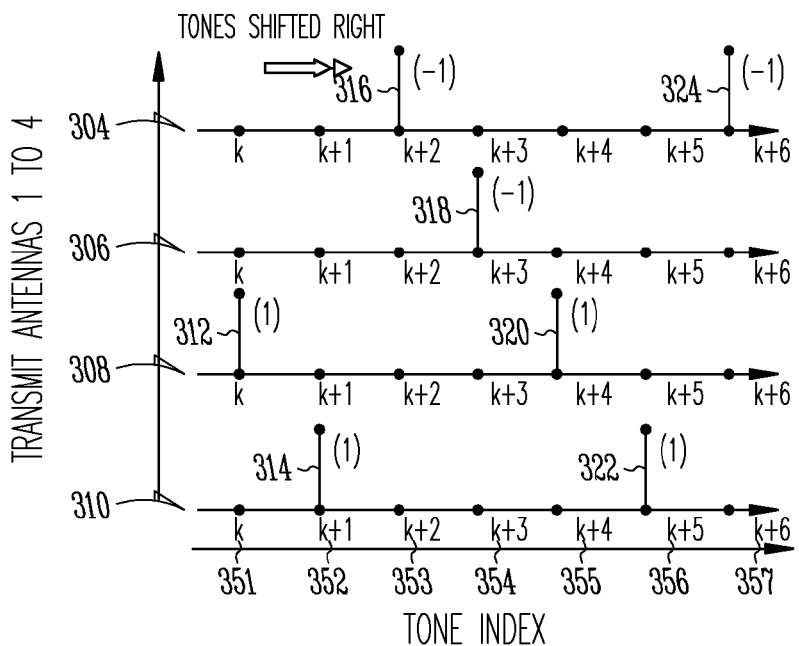

FIGS. 3A and 3B illustrate transmission of a training sequence in accordance with some embodiments of the invention. Training sequence 300 may be transmitted during a first portion of a packet preamble, such as preamble 204 (FIG. 2), and training sequence 302 may be transmitted during a second portion of the packet preamble, such as a field 210 (FIG. 2). In some embodiments, training sequence 302 may be transmitted as part of signal header 206 (FIG. 2). Training sequences 300 and 302 may be identical sequences, although the scope the invention is not limited in this respect. In some embodiments, tones of the sequences may be interspersed among subcarrier frequencies of the spatial channels. For example, when a high-throughput communication station utilizes four spatial channels (i.e., spatial channels 304, 306, 308 and 310), training sequence 300 may comprise first tone 312 transmitted over first spatial channel 304 on first subcarrier frequency 351 utilizing a first antenna. Second tone 314 may be transmitted over second spatial channel 306 on second subcarrier frequency 352 utilizing a second antenna. Third tone 316 may transmitted over third spatial channel 308 on third subcarrier frequency 353 utilizing a third antenna. Fourth tone 318 may transmitted over fourth spatial channel 310 on fourth subcarrier frequency 354 utilizing a fourth antenna. Fifth tone 320 may transmitted over first spatial channel 304 on fifth subcarrier frequency 355 utilizing the first antenna. Sixth tone 322 may transmitted over second spatial channel 306 on sixth subcarrier frequency 356 utilizing the second antenna. Seventh tone 324 may transmitted over third spatial channel 308 on seventh subcarrier frequency 357 utilizing the third antenna. This transmission technique may be performed for the entire length of the training sequence.

As can be seen in the example, each spatial channel has some subcarriers in which no training tones are transmitted. In this example, training tones are transmitted on every fourth subcarrier. This is unlike many conventional techniques that utilize a single channel (e.g. without spatial channels) and transmit a training tone on every subcarrier frequency. For example, training sequences in accordance with the IEEE 802.11a standard transmit a training tone on every subcarrier frequency.

In accordance with embodiments of the invention, training sequence 302 may be shifted with respect to training sequence 300 so that some subcarrier frequencies not utilized in the transmission of sequence 300 are utilized in sequence 302. In some embodiments, the subcarrier frequencies utilized in the transmission of sequence 300 are not utilized in the transmission of sequence 302, although the scope of the invention is not limited in this respect. FIG. 3B illustrates one way of shifting the training tones interspersed among subcarriers, although the scope of the invention is not limited to this illustration.

In training sequence 302, the training tones are shifted to the right by two subcarrier frequencies. First tone 312 may be transmitted over third spatial channel 308 on first subcarrier frequency 351 utilizing the third antenna. Second tone 314 may be transmitted over fourth spatial channel 310 on second subcarrier frequency 352 utilizing the fourth antenna. Third tone 316 may transmitted over first spatial channel 304 on third subcarrier frequency 353 utilizing the first antenna. Fourth tone 318 may transmitted over second spatial channel 306 on fourth subcarrier frequency 354 utilizing the second antenna. Fifth tone 320 may transmitted over third spatial channel 308 on fifth subcarrier frequency 355 utilizing the third antenna. Sixth tone 322 may transmitted over fourth spatial channel 310 on sixth subcarrier frequency 356 utilizing the fourth antenna. Seventh tone 324 may transmitted over first spatial channel 304 on seventh subcarrier frequency 357 utilizing the first antenna. This transmission technique may also be performed for the entire length of the training sequence. In this example, training sequences 300 and 302 illustrate a training sequence beginning with 1, 1, −1, −1, 1, 1, −1 . . . , although the scope of the invention is not limited in this respect.

Although training sequences 300 and 302 are described in FIGS. 3A and 3B for embodiments of the invention utilizing four spatial channels and four corresponding antennas, this is not a requirement, as other numbers of spatial channels and corresponding antennas may also be used. For example, in a system comprising N transmit antennas, every Nth value of a known orthogonal training sequence may be individually transmitted on individual subcarriers of a spatial channel during a first portion of an OFDM packet preamble, and the values of the training sequence may be shifted by less than N subcarriers for retransmission during a second portion of the OFDM packet preamble. In some embodiments, N may be any whole number greater than 1 and less than 100.

In the case of four spatial channels, every fourth value in the sequence may be transmitted on the same antenna, and the training tones may be shifted by either one, two or three positions for retransmission of the sequence during the second part of the preamble. In the case of eight spatial channels, for example, every eighth value in the sequence may be transmitted on the same antenna, and the training tones may be shifted by up to seven positions for retransmission of the sequence during the second part of the preamble. In some embodiments, better channel estimations may be made at the receiver when the tones are shifted about halfway between the subcarrier positions used in the initial transmission and those used in the retransmission. In some embodiments, a receiving station may perform an interpolation to determine channel estimates for subcarriers not having a training tone transmitted thereon during either portions of the packet preamble.

In some embodiments, the interpolation may be used to determine channel coefficients at zero tones on each of a plurality of transmit antennas. In some embodiments, the interpolation may utilize a filter, such as a linear fit, Hamming window, Hanning window, or square root raised cosine, although the scope of the invention is not limited in this respect. The quality of the channel estimate may improve with a larger filter, but complexity may increases as well. Simulations may be used to determine the exact interpolation filter. The sequences shown in FIGS. 3A and 3B may only leave 1 tone untrained. In practice there may be gaps of 2 or more tones, especially for 3 or more transmit antennas, which may require larger interpolation filters. The higher the multipath delay spread that may be experienced in the channel, the larger the interpolation filter that may be required.

In some embodiments, the training sequence may be any known sequence, and it may be almost any orthogonal sequence or quasi-orthogonal sequence, including a pseudo-random noise (PRN) sequence, although the scope of the invention is not limited in this respect.

Although sequences 300 and 302 are described for use as long packet preamble 204 (FIG. 2), either of sequences 300 or 302 may also be suitable for use as short packet preamble 202 (FIG. 2), although other sequences are also suitable. In some embodiments, short packet preamble 202 (FIG. 2) may comprise training tones transmitted on every fourth subcarrier frequency in accordance with the IEEE 802.11a standard. In some of these embodiments, the same training tone comprising short packet preamble 202 (FIG. 2) may be transmitted on every fourth subcarrier frequency of each spatial channel (e.g., simultaneously on all transmit antennas).

In some other embodiments, the training tones comprising short packet preamble 202 (FIG. 2) may be transmitted on every fourth subcarrier frequency interspersed among the spatial channels. In some other embodiments, the training tones comprising short packet preamble 202 (FIG. 2) may be transmitted on every fourth subcarrier frequency on a single antenna or over a single spatial channel. In these embodiments, the antenna or spatial channel having the best channel conditions may be selected. In yet other embodiments, the training tones comprising short packet preamble 202 (FIG. 2) may be transmitted on every fourth subcarrier frequency of each of the spatial channels, and a set of orthogonal weights may be used to weight the signals over a coherence bandwidth. Standard-throughput communication devices 106 and 108 (FIG. 1), as well as high-throughput communication device 104 (FIG. 1) should be able to receive short packet preamble 202 (FIG. 2) and process accordingly.

In some embodiments, additional training field 210 (FIG. 2) may be used when a more accurate interpolation is required for highly frequency selective channels. In some embodiments, additional training field 210 may comprise the shifted training tones, such as the tones of sequence 302. In these embodiments, the channel estimates from long preamble 204 (FIG. 2) may be averaged with the channel estimates from field 210 (FIG. 2) for possibly improved channel estimation performance. In some embodiments, when training field 210 comprises the shifted training tones, preamble 204 and signal header 206 may comprise un-shifted training tones.

In some embodiments, for more optimal channel estimation, temporal preamble sequences on the different transmit antennas and/or spatial channels may be orthogonal. A temporal preamble sequence on a transmit antenna may include symbols transmitted during long preamble 204 (FIG. 2) and additional MIMO training of portion 210.

In some embodiments, signal header 206 (FIG. 2) may be transmitted on multiple transmit antennas and/or spatial channels using the same training pattern used during the long preamble 204 (FIG. 2). Since a standard-throughput communication station may estimate the channel during the long preamble, it will see the same channel during the signal header in order to decode it correctly. Signal header 206 (FIG. 2) may include the duration of the physical packet, and a standard-throughput communication station may decode this information to set its NAV.

In some embodiments, data unit portion 208 (FIG. 2) may include data that is encoded using space-frequency-time codes. While a high-throughput communication station may decode these based on information in signal header 206 (FIG. 2) (i.e., by using reserved bits), a standard-throughput communication station may observe errors when receiving this field. In some embodiments, a standard-throughput communication station may respect the rate and length read during signal header 206 (FIG. 2) and may remain quiet for that duration.

The rate and length transmitted in signal header field 206 (FIG. 2) may be valid values that are readable by a standard-throughput communication station. In some embodiments, a high-throughput access point may provide incorrect information regarding the OFDM packet's duration in order to protect data unit portion 208 (FIG. 2) and/or an acknowledge (ACK) packet, although the scope of the invention is not limited in this respect.

In some embodiments, an additional signaling header (e.g., a new MIMO PLCP header) may be added after the training field to convey more information about the modulation type (e.g., diversity or multiplexing). In these embodiments, the high-throughput transmitting station may have already determined the optimal modulation type by some other means, and it may have used an old channel estimate when the wireless channel is sufficiently stationary. In some embodiments, it may have estimated the channel by snooping on packets meant for other destinations, or it may have estimated the channel by using reciprocity.

In some embodiments, the preambles discussed above may be used with uplink space division multiple access (SDMA) techniques. In these embodiments, instead of transmitting different tones on different transmit antennas, different communication stations may transmit on alternate tones. In these embodiments, a high-throughput access point may interpolate the channel for each communications station and may decode them simultaneously during an uplink data unit.

In some embodiments, the training tones may comprise a known training sequence. The training sequence may be an orthogonal sequence or a quasi-orthogonal sequence. A quasi-orthogonal sequence may not be necessarily mathematically orthogonal, but may be sufficiently orthogonal for use herein. In some embodiments, the training sequence transmitted during the first portion comprises two or more repeated subsequences, and the training sequence transmitted during the second portion comprises two or more repeated subsequences.

In some embodiments, the training tones may be transmitted in subsequent portions of the packet preamble. A number of portions of the packet preamble that includes the training tones may correspond to a number of transmit antennas. For example, when a communication station utilizes two antennas for transmitting, the training tones may be transmitted in a first portion of the packet preamble, and retransmitted during a second portion of the packet preamble, shifted as previously described. For example, when a communication station utilizes three antennas for transmission, a third portion of the packet preamble may be included for retransmitting the training tones, which may be further shifted. Embodiments of the present invention include communication stations that include M transmit antennas in which up to M portions of the packet preamble are included, where M may be any whole number less than 100.

In some embodiments, a standard-throughput communication station expecting transmissions from a single transmit antenna receives at least the first portion of long packet preamble 204 (FIG. 2) and signal header field 206(FIG. 2), which is transmitted using the same training pattern as the first portion. The standard-throughput communication station may set a network allocation vector in response to processing of signal header field 206(FIG. 2) and may refrains from transmitting during a subsequent predetermined time frame.

In some embodiments, the first portion of the preamble and signal header field 206 (FIG. 2) may be transmitted from multiple transmit antennas using any such signaling as can be recognized by a device (e.g., legacy or high throughput) which expects transmissions from a single transmit antenna. The second portion of the preamble and the PSDU may not necessarily be readable by such a device because the signaling is intended for a device that expects multiple transmit antennas (i.e., a pre-specified number M, where M>1). One example of such signaling is illustrated in FIGS. 3A and 3B. In some other embodiments, identical preambles may be transmitted on all transmit antennas. In some other embodiments, linear combinations of IEEE 802.11a preambles may be transmitted on each of the transmit antennas, such that the receiver doesn't need to know that the signal was transmitted from the antennas.

Some embodiments of the invention may employ delay diversity. In these embodiments, the temporal signal may be delayed on the $m^{\wedge}Th$ antenna with respect to the first antenna by $(m-1)*d$ time samples, where d is the minimum delay. The delays can take on other values, and aren't limited to be linear multiples of the spacing (d). Different transmit signaling schemes may result in different performance.

Figure 4:
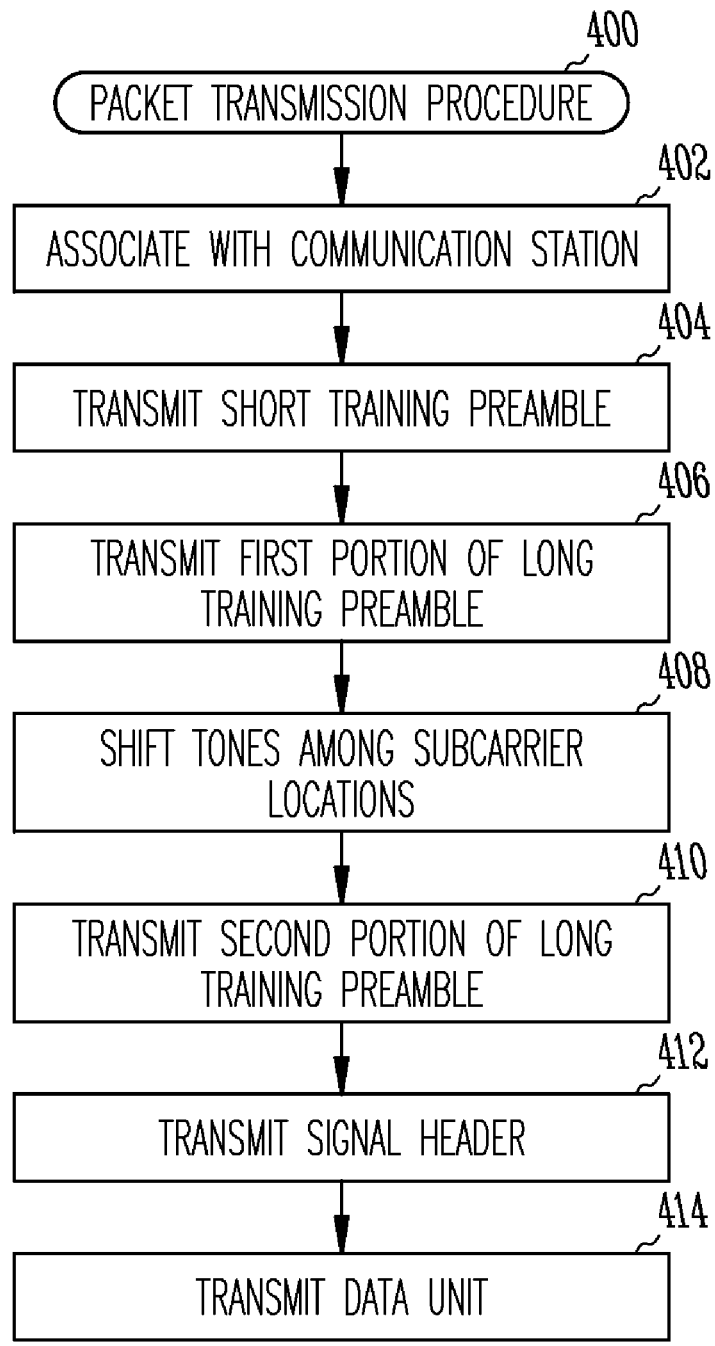
FIG. 4 is a flow chart of a packet transmission procedure in accordance with some embodiments of the invention.

FIG. 4 is a flow chart of a packet transmission procedure in accordance with some embodiments of the invention. Procedure 400 may be performed by a high-throughput communication station, such as high-throughput access point 102 (FIG. 1), or high-throughput communication station 104 (FIG. 1). In some embodiments, when a high-throughput access point performs procedure 400, both high-throughput communication stations as well as standard-throughput communication stations may receive and/or process a transmitted OFDM packet.

In operation 402, an association may be performed. The association may include the communication stations determining their communication capabilities, including the number of spatial channels and/or antennas that the devices are capable of communicating on.

In operation 404, a short training preamble, such as short-training preamble 202 (FIG. 2), may be transmitted. The short training preamble may have training tones interspersed among the spatial channels as discussed above.

In operation 406, a first portion of a long training preamble is transmitted. The first portion of the long training preamble may comprise a training sequence and may be in accordance with training sequence 300 (FIG. 3A). In some embodiments, the training tones may be transmitted over a plurality of spatial channels during a first portion of an orthogonal frequency division multiplexed packet preamble. In some embodiments, the training tones may be interspersed among subcarrier frequencies of the spatial channels.

In operation 408, the training sequence transmitted in the first portion of the long training preamble may be shifted among the subcarrier locations of the spatial channels. In some embodiments, the training tones may be shifted to differing subcarrier frequencies of the spatial channels. The differing subcarrier frequencies may be subcarrier frequencies that have not been used for transmission during the first portion of the packet preamble, although the scope of the invention is not limited in this respect.

In operation 410, the shifted training tones of the training sequence may be transmitted during the second portion of the long training preamble. In operation 412, a signal header may be transmitted. The signal header may be in accordance with signal header 210 (FIG. 2).

In operation 414, a data unit portion of the OFDM packet may be transmitted. Some OFDM packets may include a data unit portion, while others may not. The data unit portion may be in accordance with data unit portion 208 (FIG. 2). For high-throughput operation, the data unit portion comprises data symbols transmitted on the subcarriers of each spatial channel to achieve a higher throughput. In this case, each spatial channel may separate data streams transmitted thereon. For lower packet error rate operations, the data unit portion may comprise the identical data symbols transmitted on corresponding subcarriers of each spatial channel. In this case, each spatial channel may have substantially identical data streams transmitted thereon. For medium throughput and medium packet error rate operations, the data unit portion may comprise the identical data symbols transmitted on corresponding subcarriers of some of the spatial channels and may comprise different data symbols transmitted on some other spatial channels.

Although the individual operations of procedure 400 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A method performed by a base station to allow a mobile device to derive a MIMO channel estimate using transmitted downlink training signals, the method comprising:

transmitting first known training signals on first and third subcarrier frequencies by a first antenna during a first OFDM symbol time;

transmitting second known training signals on second and fourth subcarrier frequencies by a second antenna during the first OFDM symbol time;

transmitting the first known training signals on the second and fourth subcarrier frequencies by the first antenna during a second OFDM symbol time;

transmitting the second known training signals on the first and third subcarrier frequencies by the second antenna during the second OFDM symbol time;

transmitting the first known training signals on the first and third subcarrier frequencies by the first antenna during a third OFDM symbol time;

transmitting the second known training signals on the second and fourth subcarrier frequencies by the second antenna during the third OFDM symbol time;

transmitting the first known training signals on the second and fourth subcarrier frequencies by the first antenna during a fourth OFDM symbol time; and transmitting the second known training signals on the first and third subcarrier frequencies by the second antenna during the fourth OFDM symbol time, wherein the method further comprises limiting interference during the transmission of the first and second training signals by:

refraining from transmitting any signals on first and third subcarrier frequencies by the second antenna during the first OFDM symbol time;

refraining from transmitting any signals on second and fourth subcarrier frequencies by the first antenna during the first OFDM symbol time;

refraining from transmitting any signals on the second and fourth subcarrier frequencies by the second antenna during the second OFDM symbol time;

refraining from transmitting any signals on the first and third subcarrier frequencies by the first antenna during the second OFDM symbol time;

refraining from transmitting any signals on the first and third subcarrier frequencies by the first antenna during the third OFDM symbol time;

refraining from transmitting any signals on the second and fourth subcarrier frequencies by the first antenna during the third OFDM symbol time;

refraining from transmitting any signals on the second and fourth subcarrier frequencies by the second antenna during the fourth OFDM symbol time; and refraining from transmitting any signals on the first and third subcarrier frequencies by the first antenna during the fourth OFDM symbol time.

2. The method of claim 1 wherein the first and second subcarriers are separated by one or more subcarriers, the second and third subcarriers are separated by one or more subcarriers, and the third and fourth subcarriers are separated by one or more subcarriers, and wherein the first and second symbol times are separated by one or more symbol times, the second and third symbol times are separated by one or more symbol times, and the third and fourth symbol times are separated by one or more symbol times.

3. The method of claim 2 wherein the first and second training signals are QPSK modulated, and wherein each of the first, second, third and fourth symbol times comprise an OFDM symbol.

4. The method of claim 3 wherein the first and second training signals comprise first and second training sequences, respectively.

5. The method of claim 3 wherein the first and second training signals are cell specific reference signals and comprise pseudo-random sequences.

6. The method of claim 1 wherein the first and second subcarriers are separated by two subcarriers, the second and third subcarriers are separated by two subcarriers, and the third and fourth subcarriers are separated by two subcarriers, and wherein the first and second symbol times are separated by three symbol times, the second and third symbol times are separated by three symbol times, and the third and fourth symbol times are separated by three symbol times.

7. A base station configured to transmit downlink reference signals to allow a mobile device to derive a MIMO channel estimate, the base station comprising circuitry to:

transmit first known training signals on first and third subcarrier frequencies by a first antenna during a first OFDM symbol time;

transmit second known training signals on second and fourth subcarrier frequencies by a second antenna during the first OFDM symbol time;

transmit the first known training signals on the second and fourth subcarrier frequencies by the first antenna during a second OFDM symbol time;

transmit the second known training signals on the first and third subcarrier frequencies by the second antenna during the second OFDM symbol time;

transmit the first known training signals on the first and third subcarrier frequencies by the first antenna during a third OFDM symbol time;

transmit the second known training signals on the second and fourth subcarrier frequencies by the second antenna during the third OFDM symbol time;

transmit the first known training signals on the second and fourth subcarrier frequencies by the first antenna during a fourth OFDM symbol time; and transmit the second known training signals on the first and third subcarrier frequencies by the second antenna during the fourth OFDM symbol time, wherein to limit interference during the transmission of the first and second training signals, the base station is further configured to:

refrain from transmitting any signals on first and third subcarrier frequencies by the second antenna during the first OFDM symbol time;

refrain from transmitting any signals on second and fourth subcarrier frequencies by the first antenna during the first OFDM symbol time;

refrain from transmitting any signals on the second and fourth subcarrier frequencies by the second antenna during the second OFDM symbol time;

refrain from transmitting any signals on the first and third subcarrier frequencies by the first antenna during the second OFDM symbol time;

refrain from transmitting any signals on the first and third subcarrier frequencies by the second antenna during the third OFDM symbol time;

refrain from transmitting any signals on the second and fourth subcarrier frequencies by the first antenna during the third OFDM symbol time;

refrain from transmitting any signals on the second and fourth subcarrier frequencies by the second antenna during the fourth OFDM symbol time; and refrain from transmitting any signals on the first and third subcarrier frequencies by the first antenna during the fourth OFDM symbol time.

8. The base station of claim 7 wherein the first and second subcarriers are separated by one or more subcarriers, the second and third subcarriers are separated by one or more subcarriers, and the third and fourth subcarriers are separated by one or more subcarriers, and wherein the first and second symbol times are separated by one or more symbol times, the second and third symbol times are separated by one or more symbol times, and the third and fourth symbol times are separated by one or more symbol times.

9. The base station of claim 8 wherein the first and second training signals are QPSK modulated, and wherein each of the first, second, third and fourth symbol times comprise an OFDM symbol.

10. The base station of claim 9 wherein the first and second training signals comprise first and second training sequences, respectively.

11. The base station of claim 9 wherein the first and second training signals are cell specific reference signals and comprise pseudo-random sequences.

12. The base station of claim 7 wherein the first and second subcarriers are separated by two subcarriers, the second and third subcarriers are separated by two subcarriers, and the third and fourth subcarriers are separated by two subcarriers, and wherein the first and second symbol times are separated by three symbol times, the second and third symbol times are separated by three symbol times, and the third and fourth symbol times are separated by three symbol times.

13. A mobile device configured to derive a MIMO channel estimate from downlink reference signals transmitted by first and second antennas of a base station, the mobile device comprising circuitry configured to:

receive first known training signals on first and third subcarrier frequencies transmitted by the first antenna during a first OFDM symbol time;

receive second known training signals on second and fourth subcarrier frequencies transmitted by the second antenna during the first OFDM symbol time;

receive the first known training signals on the second and fourth subcarrier frequencies transmitted by the first antenna during a second OFDM symbol time;

receive the second known training signals on the first and third subcarrier frequencies transmitted by the second antenna during the second OFDM symbol time;

receive the first known training signals on the first and third subcarrier frequencies transmitted by the first antenna during a third OFDM symbol time;

receive the second known training signals on the second and fourth subcarrier frequencies transmitted by the second antenna during the third OFDM symbol time;

receive the first known training signals on the second and fourth subcarrier frequencies transmitted by the first antenna during a fourth OFDM symbol time; and receive the second known training signals on the first and third subcarrier frequencies transmitted by the second antenna during the fourth OFDM symbol time, wherein to limit interference during the transmission of the first and second training signals, the base station:

refrains from transmitting any signals on first and third subcarrier frequencies by the second antenna during the first OFDM symbol time;

refrains from transmitting any signals on second and fourth subcarrier frequencies by the first antenna during the first OFDM symbol time;

refrains from transmitting any signals on the second and fourth subcarrier frequencies by the second antenna during the second OFDM symbol time;

refrains from transmitting any signals on the first and third subcarrier frequencies by the first antenna during the second OFDM symbol time;

refrains from transmitting any signals on the first and third subcarrier frequencies by the second antenna during the third OFDM symbol time;

refrains from transmitting any signals on the second and fourth subcarrier frequencies by the first antenna during the third OFDM symbol time;

refrains from transmitting any signals on the second and fourth subcarrier frequencies by the second antenna during the fourth OFDM symbol time; and refrains from transmitting any signals on the first and third subcarrier frequencies by the first antenna during the fourth OFDM symbol time.

14. The mobile device of claim 13 wherein the first and second subcarriers are separated by one or more subcarriers, the second and third subcarriers are separated by one or more subcarriers, and the third and fourth subcarriers are separated by one or more subcarriers, and wherein the first and second symbol times are separated by one or more symbol times, the second and third symbol times are separated by one or more symbol times, and the third and fourth symbol times are separated by one or more symbol times.

15. The mobile device of claim 14 wherein the first and second training signals are QPSK modulated, and wherein each of the first, second, third and fourth symbol times comprise an OFDM symbol.

16. The mobile device of claim 15 wherein the first and second training signals comprise first and second training sequences, respectively.

17. The mobile device of claim 15 wherein the first and second training signals are cell specific reference signals and comprise pseudo-random sequences.

18. The mobile device of claim 13 wherein the first and second subcarriers are separated by two subcarriers, the second and third subcarriers are separated by two subcarriers, and the third and fourth subcarriers are separated by two subcarriers, and wherein the first and second symbol times are separated by three symbol times, the second and third symbol times are separated by three symbol times, and the third and fourth symbol times are separated by three symbol times.

* * * * *